(12) United States Patent
Aliakseyeu et al.

(10) Patent No.: US 12,159,416 B2
(45) Date of Patent: Dec. 3, 2024

(54) SELECTING AN IMAGE ANALYSIS AREA BASED ON A COMPARISON OF DYNAMICITY LEVELS

(71) Applicant: SIGNIFY HOLDING B.V., Eindhoven (NL)

(72) Inventors: Dzmitry Viktorovich Aliakseyeu, Eindhoven (NL); Jonathan David Mason, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 341 days.

(21) Appl. No.: 17/634,127

(22) PCT Filed: Aug. 20, 2020

(86) PCT No.: PCT/EP2020/073272
§ 371 (c)(1),
(2) Date: Feb. 9, 2022

(87) PCT Pub. No.: WO2021/032811
PCT Pub. Date: Feb. 25, 2021

(65) Prior Publication Data
US 2022/0319015 A1    Oct. 6, 2022

(30) Foreign Application Priority Data

Aug. 22, 2019 (EP) .................................... 19193052

(51) Int. Cl.
*G06T 7/215* (2017.01)
*G06T 7/12* (2017.01)
*H05B 47/155* (2020.01)

(52) U.S. Cl.
CPC ............... *G06T 7/215* (2017.01); *G06T 7/12* (2017.01); *H05B 47/155* (2020.01); *G06T 2207/10152* (2013.01)

(58) Field of Classification Search
CPC . G06T 7/215; G06T 7/12; G06T 2207/10152; H05B 47/155; G06V 20/46; H04N 5/57; H04N 9/73
See application file for complete search history.

(56) References Cited

U.S. PATENT DOCUMENTS

| 8,179,400 B2 * | 5/2012 | Kwisthout | H04N 5/44 382/253 |
| 2007/0091111 A1 * | 4/2007 | Gutta | H04N 9/73 345/591 |

(Continued)

FOREIGN PATENT DOCUMENTS

| EP | 1994801 A1 | 11/2008 |
| EP | 2163102 A1 | 3/2010 |

(Continued)

*Primary Examiner* — Bobbak Safaipour

(57) ABSTRACT

A system (1) is configured to determine a first level of dynamicity in video frames, determine a second level of dynamicity in each of a plurality of analysis areas (52,73) in the video frames, compare each of the second dynamicity levels with the first dynamicity level, select a subset (73) of the analysis areas based on the comparisons, determine image characteristics from the subset of analysis areas in the video content, determine one or more light effects based on the image characteristics, and control one or more lighting device to render the one or more light effects and/or store a light script specifying the one or more light effects. The light effects are to be rendered while the video content is rendered on a display device (9).

14 Claims, 7 Drawing Sheets

(56) References Cited

U.S. PATENT DOCUMENTS

| | | | |
|---|---|---|---|
| 2009/0175536 A1 | 7/2009 | Gutta et al. | |
| 2009/0237567 A1 | 9/2009 | Tsao | |
| 2010/0165000 A1* | 7/2010 | Seuntiens | H04N 9/73 |
| | | | 345/690 |
| 2014/0104498 A1 | 4/2014 | Li et al. | |
| 2015/0248872 A1 | 9/2015 | Fleureau et al. | |
| 2018/0330165 A1 | 11/2018 | Halligan et al. | |
| 2019/0035429 A1* | 1/2019 | Patry | G11B 27/031 |
| 2021/0410251 A1* | 12/2021 | Rycroft | G06V 20/49 |
| 2024/0064883 A1* | 2/2024 | Van Den Broek | |
| | | | H05B 47/1965 |

FOREIGN PATENT DOCUMENTS

| | | |
|---|---|---|
| EP | 3434072 A1 | 1/2019 |
| JP | 2005251508 A | 9/2005 |
| JP | 2006107905 A | 4/2006 |
| JP | 2007521775 A | 8/2007 |
| JP | 2009528755 A | 8/2009 |
| JP | 2017539057 A | 12/2017 |
| JP | 2019501484 A | 1/2019 |
| JP | 2019515706 A | 6/2019 |
| RU | 2450475 C2 | 5/2012 |
| WO | 2016194311 A1 | 12/2016 |
| WO | 2014053391 A1 | 9/2017 |
| WO | 2017162539 A1 | 9/2017 |

* cited by examiner

SELECTING AN IMAGE ANALYSIS AREA BASED ON A COMPARISON OF DYNAMICITY LEVELS

CROSS-REFERENCE TO PRIOR APPLICATIONS

This application is the U.S. National Phase application under 35 U.S.C. § 371 of International Application No. PCT/EP2020/073272, filed on Aug. 20, 2020, which claims the benefit of European Patent Application No. 19193052.8, filed on Aug. 22, 2019. These applications are hereby incorporated by reference herein.

FIELD OF THE INVENTION

The invention relates to a system for determining image characteristics from an analysis area in video content, said image characteristics being used to determine one or more light effects to be rendered on one or more lighting devices while said video content is rendered on a display device.

The invention further relates to a method of determining image characteristics from an analysis area in video content, said image characteristics being used to determine one or more light effects to be rendered on one or more lighting devices while said video content is rendered on a display device.

The invention also relates to a computer program product enabling a computer system to perform such a method.

BACKGROUND OF THE INVENTION

Philips' Hue Entertainment and Hue Sync are gaining popularity. Philips Hue Sync enables the rendering of light effects based on the content that is played on a computer, e.g. video games. A dynamic lighting system can dramatically influence the experience and impression of audio-visual material, especially when the colors sent to the lights match what would be seen in the composed environment around the screen. This new use of light can bring the atmosphere of a video game right into the room with the player. Gamers can immerse themselves in the ambience of the gaming environment and enjoy the flashes of weapons fire or magic spells and sit in the glow of the force fields as if they were real.

Hue Sync works by observing analysis areas of the video content and computing light output parameters that are rendered on Hue lights around the screen. A similar technique is described in US 2009/175536 A1. US 2009/175536 A1 discloses extracting and processing video content encoded in a rendered color space to be emulated by an ambient light source, comprising extracting color information from a video signal and transforming the color information through unrendered color space using tristprimary matrices to form a second rendered color space to drive the ambient light source. Video signal decoding into frames can allow extracting average or other color information from selected screen regions to reduce bitstream load, and negative gamma correction helps prevent garish or inappropriate chromaticities and luminance.

Currently, fixed predefined analysis areas are used for color extraction, i.e. for determining light effects, in Hue Sync. A drawback of this approach is that for video games, the determined light effects are regularly perceived as not matching the video content of the video game.

SUMMARY OF THE INVENTION

It is a first object of the invention to provide a system, which is able to determine image characteristics from video content in a manner suitable for games.

It is a second object of the invention to provide a method, which is able to determine image characteristics from video content in a manner suitable for games.

In a first aspect of the invention, a system for determining image characteristics from an analysis area in video content, said image characteristics being used to determine one or more light effects to be rendered on one or more lighting devices while said video content is rendered on a display device, comprises at least one output interface, and at least one processor configured to use obtain video frames, determine a first level of dynamicity in said video frames, and determine a second level of dynamicity in each of a plurality of analysis areas in said video frames.

The at least one processor is further configured to compare each of said second dynamicity levels with said first dynamicity level, select a subset of said analysis areas based on said comparisons, determine image characteristics from said subset of analysis areas in said video content, determine one or more light effects based on said image characteristics, and use said at least one output interface to control said one or more lighting device to render said one or more light effects and/or store a light script specifying said one or more light effects.

The level of dynamicity in the video frames represents how dynamic those video frames are, i.e. how much the video frames change from one frame to another frame. The level of dynamicity in an analysis area represents how dynamic this analysis area is, i.e. how much the analysis area changes from one frame to another frame. There are multiple ways in which the level of dynamicity may be determined, as will be described later in this description.

Games may differ greatly in how the "action" is distributed across the screen. In some games it is the whole screen with a few user interface (UI) elements. For others, the UI might take big part of the screen, and for yet a third type, all action might be happening right in the center of the screen with little or no action on the sides of the screen. Said system allows one or more analysis areas to be selected with the level of dynamicity that is most similar to the overall level of dynamicity of the video frames. Levels of dynamicity may be considered similar if they represent a similar amount of changes in brightness and/or chromaticity, for example.

Although an analysis area with a higher level of dynamicity may regularly be preferred over an analysis area with a lower level of dynamicity, there are also situations where an analysis area with a higher level of dynamicity is not preferred, e.g. because slower dynamics are more optimal for ambiance light. Furthermore, an analysis area in which changes happen mostly in brightness, while the overall video content has more colorful dynamics, is not optimal either. By selecting analysis areas based on a comparison of their levels of dynamicity with the level of dynamicity of the video frames, the dynamicity of the light effects and the dynamicity of the video content may be aligned. This helps in making the light effects match the video content, e.g. of the video game.

Said first dynamicity level may be determined per pixel or per region of pixels and then, for example, averaged. Said video frames and said video content may belong to a same game, a same type of game or a same collection of games, for example.

Said at least one processor may be configured to select said subset of said analysis areas by selecting one or more second dynamicity levels which are similar to or the same as said first dynamicity level from said determined second dynamicity levels. If second dynamicity levels are determined for a sufficiently large number of analysis areas, then it is likely that one of these analysis areas has a second dynamicity level which is the same as or similar to the first dynamicity level, which results in light effects that match very well with the video content. Alternatively, the one or more second dynamicity levels which are most similar to the first dynamicity levels may be selected.

One or more of said subset of analysis areas may have a different size and/or position than a default analysis area while staying within boundaries specified for said default analysis area. Typically, a lighting device is associated with a certain default analysis area based on the location of the lighting device, e.g. a light device to the left of a TV is associated with a zone on the left side of the video frames. By staying with the boundaries specified for the default analysis area, it may be ensured that this association stays correct.

Said video frames may be part of said video content. This allows the analysis areas to be changed while a game is being played, for example. Alternatively, the analysis areas may only be changed the next time the same game, a game of the same type or a game of the same collection of games is played, for example.

Said at least one processor may be configured to determine said first dynamicity level and/or said second dynamicity levels in one or more of the following manners (for best performance, multiple of these manners may be implemented and then compared):

A: said at least one processor may be configured to determine said first dynamicity level and/or said second dynamicity levels by comparing successive ones of said video frames. A1: said at least one processor may be configured to determine chromaticity and/or brightness differences in said successive ones of said video frames, for example. A2: said at least one processor may be configured to detect edges in each of said successive ones of said video frames and determine changes in said detected edges between said successive ones of said video frames, for example.

B: said at least one processor may be configured to determine said first dynamicity level and/or said second dynamicity levels by determining a color histogram over said video frames. Said at least one processor may be configured to determine how many colors have appeared more than a predetermined number of times in said color histogram, for example.

In a second aspect of the invention, a method of determining image characteristics from an analysis area in video content, said image characteristics being used to determine one or more light effects to be rendered on one or more lighting devices while said video content is rendered on a display device, comprises obtaining video frames, determining a first level of dynamicity in said video frames, and determining a second level of dynamicity in each of a plurality of analysis areas in said video frames.

The method further comprises comparing each of said second dynamicity levels with said first dynamicity level, selecting a subset of said analysis areas based on said comparisons, determining image characteristics from said subset of analysis areas in said video content, determining one or more light effects based on said image characteristics, and controlling said one or more lighting device to render said one or more light effects and/or store a light script specifying said one or more light effects. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores a software code portion, the software code portion, when executed or processed by a computer, being configured to perform executable operations for of determining image characteristics from an analysis area in video content, said image characteristics being used to determine one or more light effects to be rendered on one or more lighting devices while said video content is rendered on a display device.

The executable operations comprise obtaining video frames, determining a first level of dynamicity in said video frames, determining a second level of dynamicity in each of a plurality of analysis areas in said video frames, comparing each of said second dynamicity levels with said first dynamicity level, selecting a subset of said analysis areas based on said comparisons, determining image characteristics from said subset of analysis areas in said video content, determining one or more light effects based on said image characteristics, and controlling said one or more lighting device to render said one or more light effects and/or store a light script specifying said one or more light effects.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like, conventional procedural programming languages, such as the "C" programming language or similar programming languages, and functional programming languages such as Scala, Haskell or the like. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

and

Figure 13:
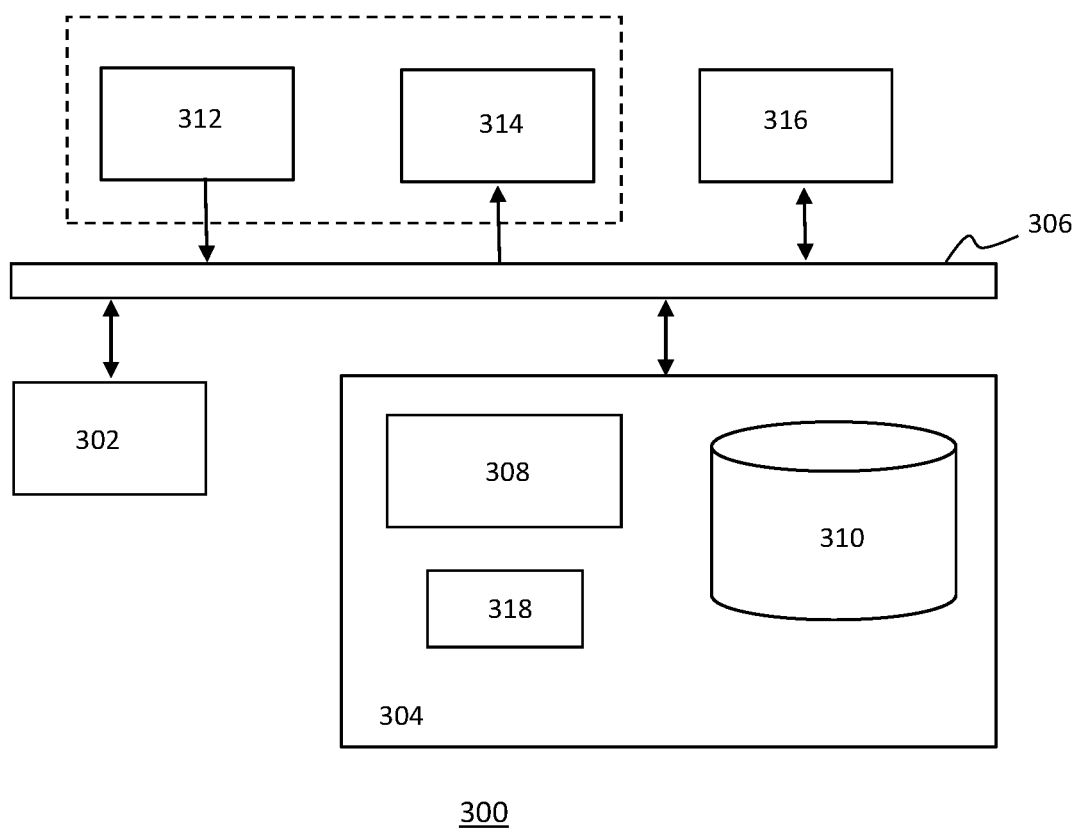

FIG. 13 is a block diagram of an exemplary data processing system for performing the method of the invention.

Corresponding elements in the drawings are denoted by the same reference numeral.

DETAILED DESCRIPTION OF THE EMBODIMENTS

Figure 1:
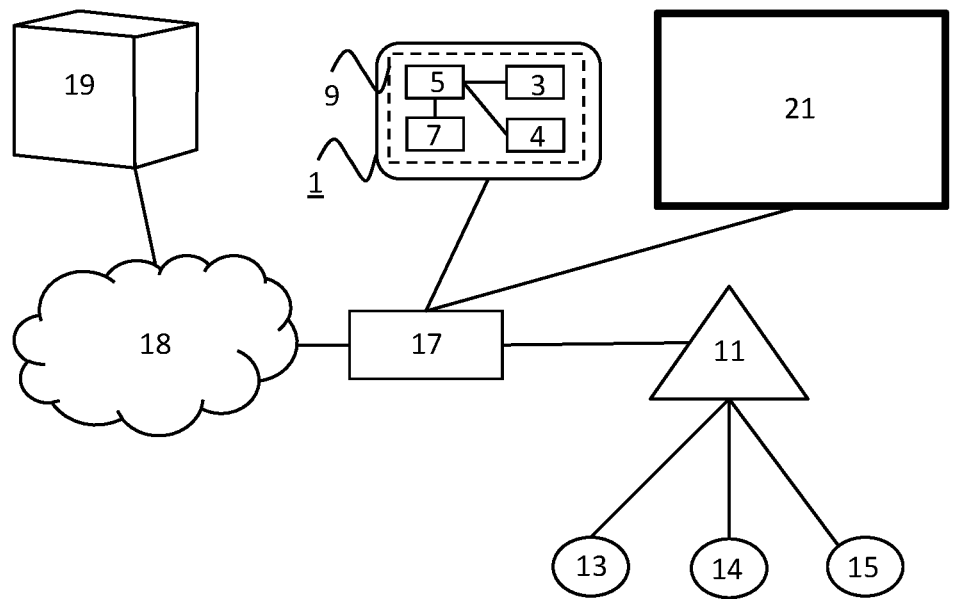
FIG. 1 is a block diagram of an embodiment of the system.

FIG. 1 shows an embodiment of the system for determining image characteristics from an analysis area in video content: mobile device 1. The image characteristics are used to determine one or more light effects to be rendered on one or more lighting devices while the video content is rendered on a display device. The mobile device 1 may be a mobile phone or a tablet, for example.

Mobile device 1 is connected to a wireless LAN access point 17. A bridge 11 is also connected to the wireless LAN access point 17, e.g. via Ethernet. Lighting devices 13, 14 and 15 communicate wirelessly with the bridge 11, e.g. using the Zigbee protocol, and can be controlled via the bridge 11, e.g. by the mobile device 1. The bridge 11 may be a Philips Hue bridge and the lighting devices 13-15 may be Philips Hue lights, for example. The wireless LAN access point 17 is connected to the Internet 18. An Internet server 19 is also connected to the Internet 18.

The mobile device 1 comprises a processor 5, a receiver 3, a transmitter 4, a memory 7 and a display 9. The processor 5 is configured to obtain video frames (e.g. by using screen capture software), determine a first level of dynamicity in the video frames, determine a second level of dynamicity in each of a plurality of analysis areas in the video frames, and compare each of the second dynamicity levels with the first dynamicity level.

The processor 5 is further configured to select a subset of the analysis areas based on the comparisons, determine image characteristics from the subset of analysis areas in the video content, determine one or more light effects based on the image characteristics, and use the at transmitter 4 to control the lighting devices 13-15 to render the one or more light effects and/or store a light script specifying the one or more light effects, e.g. in memory 7 or on the Internet server 19. The video content may be rendered on the display 9 and/or a TV 21, for example. The TV 21 is also connected to the wireless LAN access point 17.

The video frames and the video content may belong to a same game, a same type of game or a same collection of games, for example. The game(s) may be obtained from the Internet server 19 by using receiver 3, for example. Information identifying the determined analysis areas may be transmitted to the Internet server 19 to allow other people to use them for the same game, the same type of game or a game of the same collection of games. The determined analysis areas may be recommended to other users when they start the same game, the same type of game or a game of the same collection of games, for example.

The selection of a new analysis area is also referred to as "analysis area adjustment" in this description. The amount of analysis area adjustment may be limited by the mobile device 1. For example, moving or changing the size of an analysis area may only be allowed within predefined boundaries. For instance, areas around the current analysis areas (with the same size or different sizes) that are within the predefined boundaries may be analyzed and if better suited analysis areas are identified, they may be proposed to the user.

The predefined boundaries may be associated with a zone (e.g. left, right, center). For example, if a zone is mapped to the lighting device in the center, the analysis area for this zone should not be moved significantly off the center and the same applies for the left and right zones. A zone typically has a default analysis area.

The video frames may be part of the video content. Thus, the analysis area adjustment may be performed in real time (normally without user intervention). This may be implemented, for example, by using two analysis areas. The first analysis area is the current analysis area from which the light effects are determined. This is typically the default analysis area at the start of the video content, e.g. game. The second analysis area follows the action, e.g. is determined based on object/blob detection in a dynamicity heat map, within the boundaries of the corresponding zone.

The fact that the second analysis area comprises a blob does not necessarily mean that the level of dynamicity of the second analysis area is more similar to the overall level of dynamicity than the level of dynamicity of the first analysis area. However, if the comparison indicates that this is the case, then the second area analysis area is selected to optimize the dynamics of the resulting light effects. For example, in a shooter game, some action may take place off center during a short battle. This would be detected, and the light rendering would be targeted on that area for the necessary time.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from Qualcomm or ARM-based, or an application-specific processor. The processor 5 of the mobile device 1 may run an Android or iOS operating system for example. The memory 7 may comprise one or more memory units. The memory 7 may comprise solid-state memory, for example. The memory 7 may be used to store an operating system, applications and application data, for example.

The receiver 3 and the transmitter 4 may use one or more wireless communication technologies such as Wi-Fi (IEEE 802.11) to communicate with the wireless LAN access point 17, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The display 9 may comprise an LCD or OLED panel, for example. The display 9 may be a touch screen. The mobile device 1 may comprise other components typical for a mobile device such as a battery and a power connector. The invention may be implemented using a computer program running on one or more processors.

In the embodiment of FIG. 1, the system of the invention is a mobile device. In an alternative embodiment, the system of the invention is a different device, e.g. a PC, a laptop, a TV (e.g. TV 21), an HDMI module, or an Internet server (e.g. Internet server 19). An HDMI module may capture what a personal computer sends to the TV 21 by connecting in between and then sending the light commands either to the bridge 11 or directly to lighting devices 13-15. This may be used if the content is provided to the TV 21 via an HDMI cable.

Figure 2:
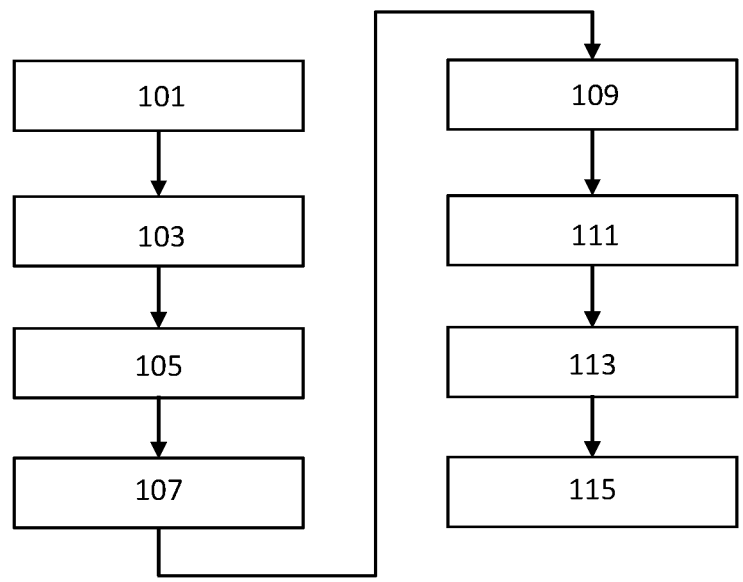
FIG. 2 is a flow diagram of a first embodiment of the method.

A first embodiment of the method of determining image characteristics from an analysis area in video content is shown in FIG. 2. The image characteristics are used to determine one or more light effects to be rendered on one or more lighting devices while the video content is rendered on a display device. A step 101 comprises obtaining video frames. A step 103 comprises determining a first level of dynamicity in the video frames. A step 105 comprises determining a second level of dynamicity in each of a plurality of analysis areas in the video frames. A step 107 comprises comparing each of the second dynamicity levels with the first dynamicity level.

A step 109 comprises selecting a subset of the analysis areas based on the comparisons. A step 111 comprises determining image characteristics from the subset of analysis areas in the video content. A step 113 comprises determining one or more light effects based on the image characteristics. A step 115 comprises controlling the one or more lighting device to render the one or more light effects and/or storing a light script specifying the one or more light effects.

Thus, when a user is playing a game or watching other video content, the level of dynamics is monitored on the whole screen (e.g. per pixel or per small area) and these measured dynamics are then compared with dynamics of each analysis area (which corresponds to the dynamics of the light effects determined from this analysis area) and the analysis area(s) that have the most similar level of dynamics as the whole screen may be used as new analysis area(s), e.g. just before starting the game the next time. The selected analysis area(s) may have a higher level of dynamics, more colorful dynamics (i.e. changes happen more in color rather than brightness only) or slower dynamics (e.g. more optimal for the ambiance light) than the non-selected analysis area(s), for example.

Figure 3:
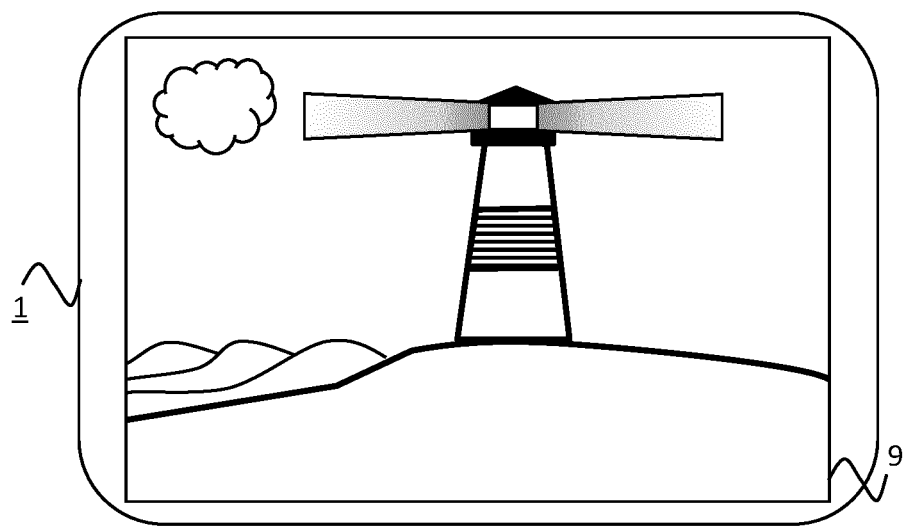
FIG. 3 shows an example of video content being displayed.
Figure 4:
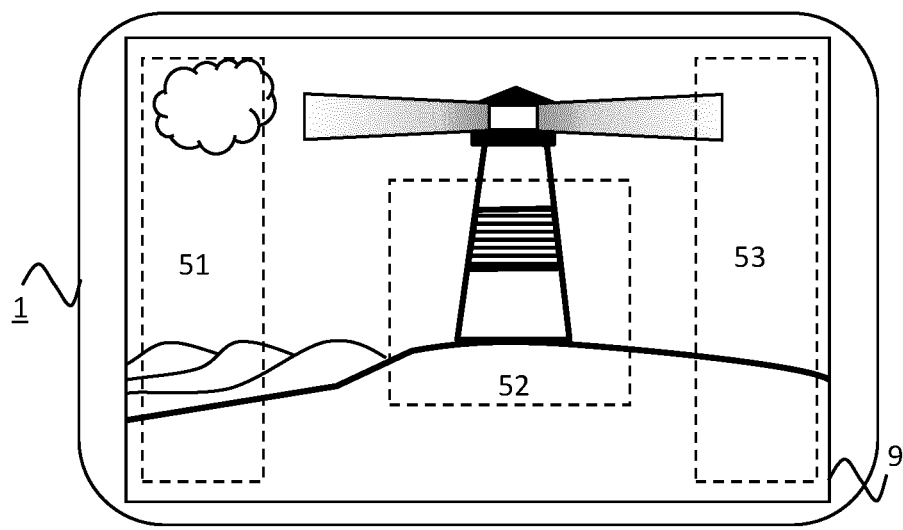
FIG. 4 shows an example of analysis areas being used to analyze the video content of FIG. 3.

This first embodiment of the method is illustrated with the help of FIGS. 3 to 8. FIG. 3 shows an example of video content being displayed on display 9 of mobile device 1. Typically, multiple regions of the screen are mapped to different lighting devices and each analysis area region is analyzed separately. FIG. 4 shows three analysis area regions 51, 52 and 53 mapped to lighting devices 13, 14 and 15, respectively. In a basic implementation of step 113, a color is extracted per analysis area from the pixels in the analysis area and used in the light effect for the corresponding lighting device.

As will be described in relation to FIGS. 9 to 11, the level of dynamicity may be determined with different algorithms. A dynamicity heat map may give a good picture of overall content dynamics and content dynamics per pixel/small area. When such a map is created, the dynamics level per analysis area can be determined and compared with overall dynamicity.

Figure 5:
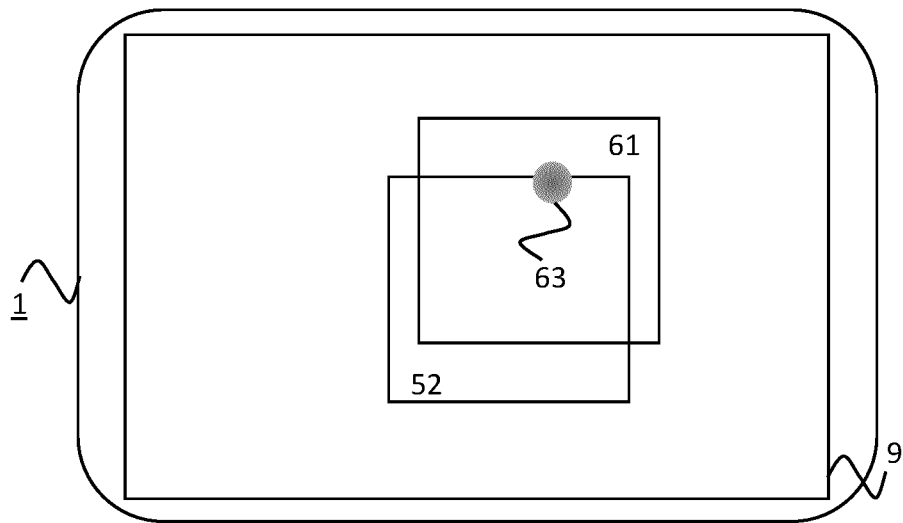
FIG. 5 illustrates an example in which an analysis area with off-center dynamics is selected.
Figure 6:
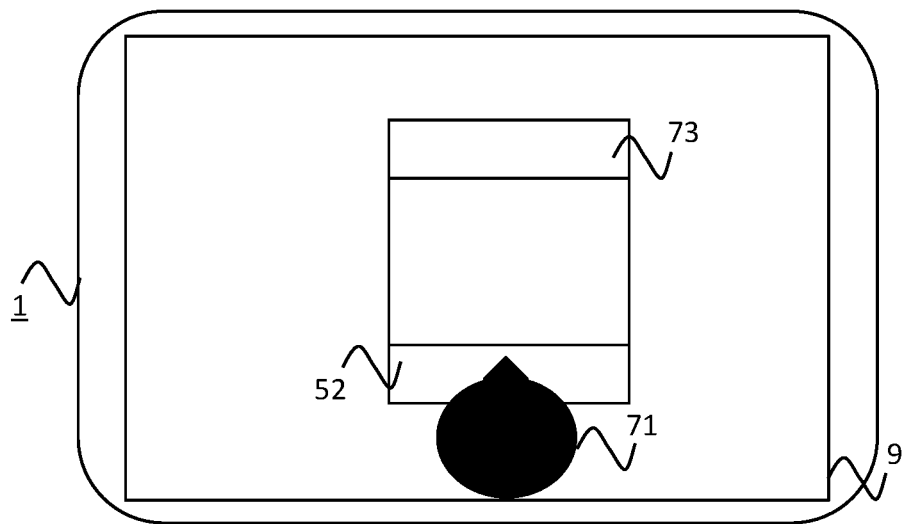
FIG. 6 illustrates an example in which an analysis area with colorful dynamics is selected.

FIGS. 5 and 6 illustrate examples in which an analysis area different from a default analysis area is more optimal than the default analysis area. FIG. 5 illustrates an example in which an analysis area with off-center dynamics is selected. FIG. 5 shows a default analysis area 52 for the center of video content and an alternative analysis area 61.

In certain games, like League of Legends, there is often a lot off action off center and the level of dynamicity of the default center analysis area is often lower than the overall level of dynamicity, resulting in light effects that are less dynamic than the displayed video content. FIG. 5 shows a dynamicity heat map with the highest level of dynamicity in blob 63. Alternative analysis area 61 has been determined so as to surround this blob 63 and it is determined to be beneficial to select alternative analysis area 61 instead of default analysis area 52, as this will result in light effects with a higher level of dynamicity, more similar to that of the video content. When the game is started again, the user could get a suggestion to shift the center zone to have a better alignment between the dynamicity levels of the screen and of the light effects.

If real-time analysis is required, it may be beneficial to only determine the level of dynamicity of a few analysis areas per different zone of the screen (e.g. left, center, right). This process could be performed iteratively, each time including at least one new analysis area. For example, one or more new analysis areas next to the current analysis area may be included to see if the level of dynamicity of the center analysis area increases if the center analysis area is moved slightly.

FIG. 6 illustrates an example in which an analysis area with colorful dynamics is selected. FIG. 6 shows a default analysis area 52 for the center of video content and an alternative analysis area 73. Certain games, like Call of Duty, have a visualization of the weapon that the character carries. In FIG. 6, a graphic 71 is such a visualization of a weapon. When the character runs or walks, the weapon moves up and down—often entering and leaving the default analysis area—and creates very dynamic light effects that do not coincide with the level of dynamicity on screen.

Furthermore, the default analysis area 52 will have a very low level of color dynamics: although there may be a lot of movement, the same set of colors is used. The alternative analysis area 73 (the area slightly above the screen center and just above the weapon), on the other hand, has more colorful dynamics. It is therefore beneficial to select alternative analysis area 73 instead of default analysis area 52 and this will result in light effects that are less dynamic overall, but which are more colorful. When user starts the game the next time, the user could get a suggestion to shift the center zone to avoid influence of gun movement.

In the examples of FIGS. 5 and 6, the center analysis area is moved, but not changed in size. However, it is also possible to additionally or alternatively change the size of an analysis area. For example, the sides of the video content are often used to create an ambiance. If some very dynamic UI elements (e.g. chat for online games) are used at a side of the video content, this would create very dynamic light effects that do not coincide with overall game dynamics. In this case, the system might suggest a larger analysis area to reduce the influence of the dynamic UI element, i.e. create slower dynamics.

Although it might be better to simply remove these dynamic parts from analysis completely, in many cases, these UI elements are transparent (such as overlay chat) so removing them might influence the overall color of the light effects. Moreover, it is not always clear what the boundaries of such areas are, so it is more straightforward to simply increase the size of the analysis area to reduce their influence of these UI elements.

Figure 7:
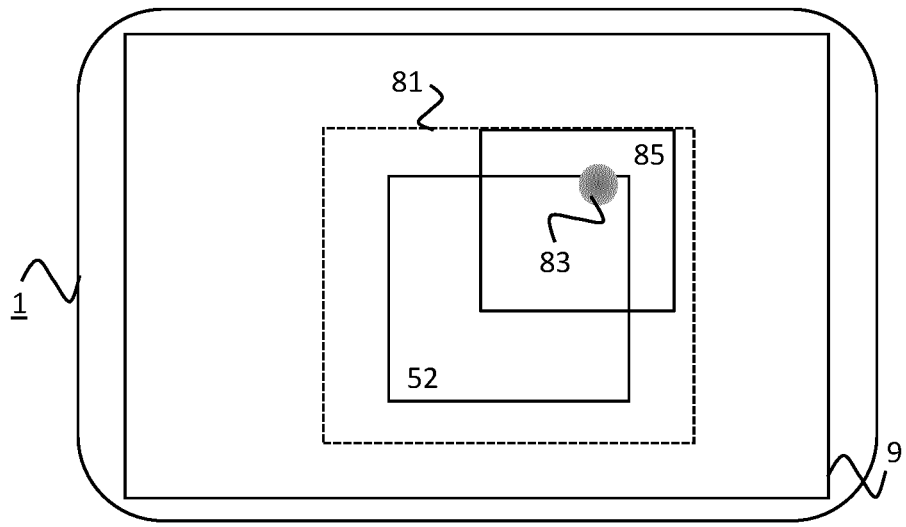
FIG. 7 illustrates an embodiment in which a center analysis area is restricted to certain boundaries.

FIG. 7 illustrates an example in which an alternative analysis area 85 has a smaller size than the default analysis area 52. The reason that the alternative analysis area 85 has a smaller size in FIG. 7 is that in the embodiment of FIG. 7, the center analysis area is restricted to certain boundaries: the boundaries of rectangle 81. Thus, the alternative analysis areas 85 has a different size and position than the default analysis area 52 while staying within boundaries specified for the default analysis area 52. Like in the example of FIG. 5, the alternative analysis area 85 is selected instead of default analysis area 52, because this will result in light effects with a higher level of dynamicity.

In the embodiment of FIG. 7, object/blob detection is repeatedly applied on the dynamics heat map and a new center analysis area is selected if necessary. For example, if the blob 83 has moved to the left, another analysis area comprising the blob 83 is selected. In the embodiment of FIG. 7, the new analysis area may need to be (even) smaller in size to stay within the boundaries of rectangle 81, e.g. if the blob 83 has moved upward as well.

Figure 8:
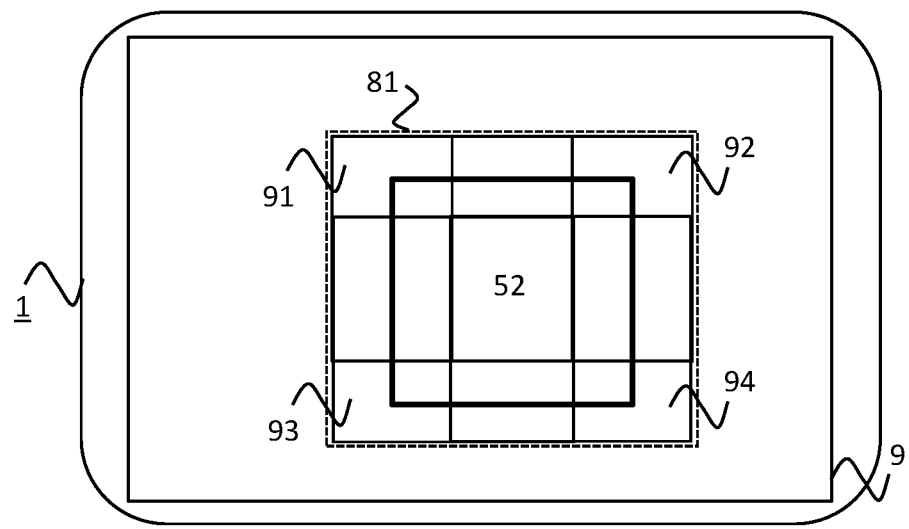
FIG. 8 illustrates an embodiment in which a dynamicity level is determined for five center analysis areas.

In the examples of FIGS. 5 to 7, an overall level of dynamicity is compared with a level of dynamicity of two analysis areas: a default analysis area and an alternative analysis area. FIG. 8 illustrates an embodiment in which a dynamicity level is determined for five center analysis areas: default center analysis area 52 and four alternative analysis areas 91-94. In this embodiment, the center analysis area is restricted to certain boundaries, i.e. the boundaries of rectangle 81, like in the embodiment of FIG. 7. In the example of FIG. 8, the sizes of the analysis areas are all the same.

In the examples of FIGS. 5 to 8, an analysis area is only selected for the center zone. Alternatively or additionally, analysis areas may be selected for other zones, e.g. for a left and right zone.

Figure 9:
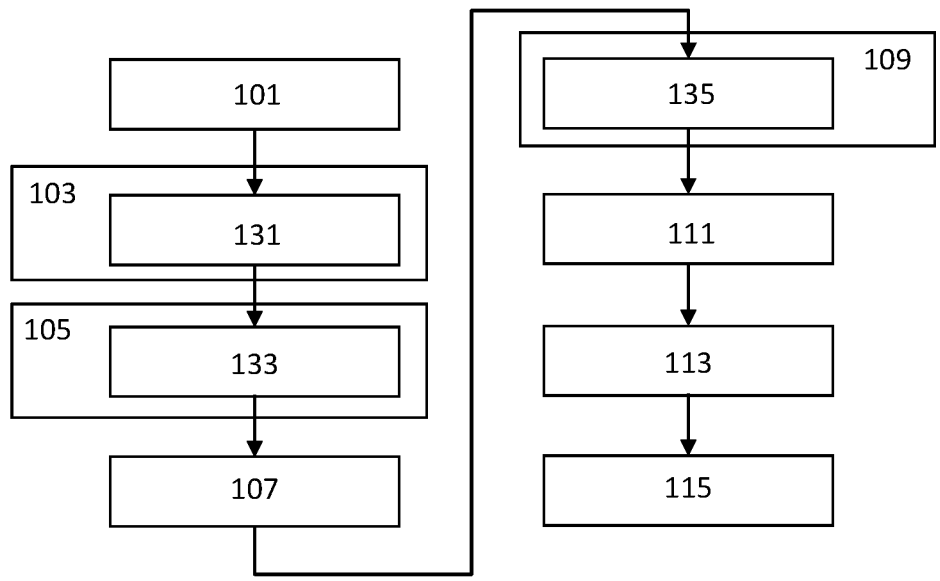
FIG. 9 is a flow diagram of a second embodiment of the method.

A second embodiment of the method of determining image characteristics from an analysis area in video content is shown in FIG. 9. In the embodiment of FIG. 9, step 103 of FIG. 3 comprises a sub step 131, step 105 of FIG. 3 comprises a sub step 133 and step 109 of FIG. 3 comprises a sub step 135. The first dynamicity level determined in step 131 represents an overall dynamicity of the video frames and is determined per pixel or per region of pixels.

In steps 131 and 133, the first level of dynamicity is determined in the video frames and the second level of dynamicity is determined in each of a plurality of analysis areas in the video frames, respectively. In steps 131 and 133, the first dynamicity level and/or the second dynamicity levels are determined by comparing successive ones of the video frames.

Steps 131 and 133 comprise determining chromaticity and/or brightness differences in these successive video frames, specifically cumulative frame differences. In these steps, the difference between each consecutive frame is summed up over a set time (e.g. play session). An additional threshold value or threshold function may be applied to reduce the impact of small changes. Cumulative differences may be calculated in gray scale where all colors are combined, per RGB color, or split and measured per brightness and color component (e.g. in XYZ or Lab color spaces), for example.

Step 107 comprises comparing each of the second dynamicity levels with the first dynamicity level. Step 135 comprises selecting a subset of the analysis areas by selecting the one or more of the second dynamicity levels that are (most) similar to or the same as the first dynamicity level. Next, steps 111-115 of FIG. 3 are performed.

Figure 10:
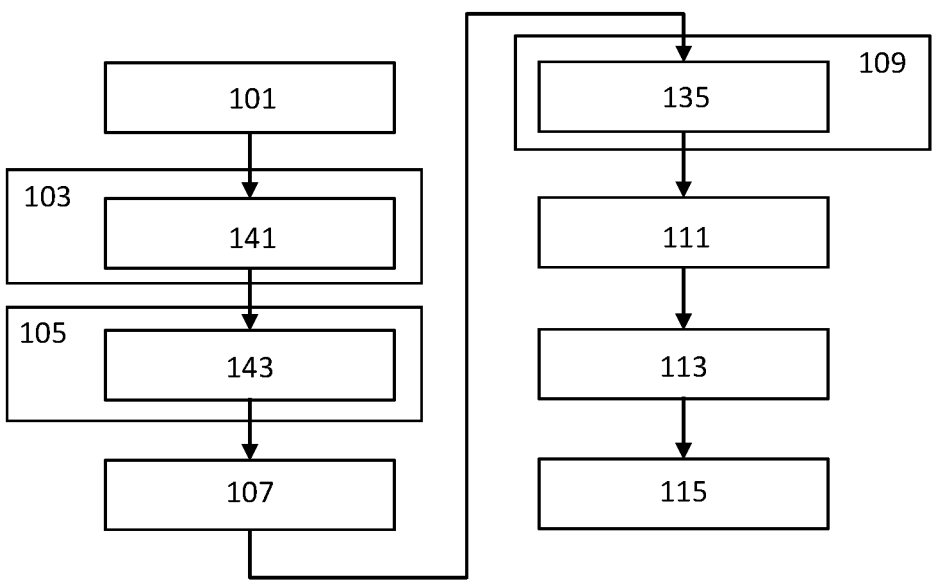
FIG. 10 is a flow diagram of a third embodiment of the method.

A third embodiment of the method of determining image characteristics from an analysis area in video content is shown in FIG. 10. In the embodiment of FIG. 10, step 103 of FIG. 3 comprises a sub step 141 and step 105 of FIG. 3 comprises a sub step 143. The first dynamicity level determined in step 141 represents an overall dynamicity of the video frames and is determined per pixel or per region of pixels.

In steps 141 and 143, the first level of dynamicity is determined in the video frames and the second level of dynamicity is determined in each of a plurality of analysis areas in the video frames, respectively. In steps 141 and 143, the first dynamicity level and/or the second dynamicity levels are determined by comparing successive ones of the video frames.

Steps 141 and 143 comprise detecting edges in each of the successive ones of the video frames and determining changes in the detected edges between the successive ones of the video frames. Steps 141 and 143 are like steps 131 and 133 of FIG. 9, but they use cumulative differences in edges instead of cumulative differences in color. As a result, areas with a lot of objects movement are highlighted compared to stable areas of the screen such as edges of the UI.

Step 107 comprises comparing each of the second dynamicity levels with the first dynamicity level. Like in FIG. 9, step 109 comprises a sub step 135, which comprises selecting a subset of the analysis areas by selecting the one or more of the second dynamicity levels that are (most) similar to or the same as the first dynamicity level. Next, steps 111-115 of FIG. 3 are performed.

Figure 11:
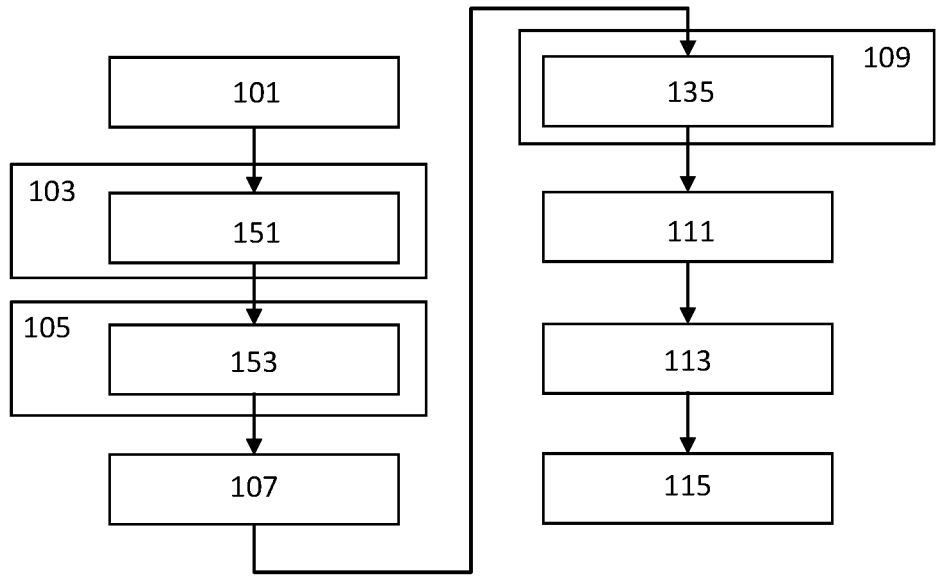
FIG. 11 is a flow diagram of a fourth embodiment of the method.

A fourth embodiment of the method of determining image characteristics from an analysis area in video content is shown in FIG. 11. In the embodiment of FIG. 11, step 103 of FIG. 3 comprises a sub step 151 and step 105 of FIG. 3 comprises a sub step 153. The first dynamicity level determined in step 151 represents an overall dynamicity of the video frames and is determined per pixel or per region of pixels.

In steps 151 and 153, the first level of dynamicity is determined in the video frames and the second level of dynamicity is determined in each of a plurality of analysis areas in the video frames, respectively. In steps 151 and 153, the first dynamicity level and the second dynamicity levels are determined by determining a color histogram over the video frames. This is also referred to in this description as entropy estimation.

Instead of calculating the difference between each consecutive frame, the change in chromaticity and/or brightness of each pixel/area over the measuring time is used to create a chromaticity/brightness histogram for the said pixel or area and this color histogram is then used to measure entropy that would indicate how much this pixel changes over the time. Steps 151 and 153 further comprise determining how many colors have appeared more than a predetermined number of times in the color histogram. In an alternative embodiment, the dynamicity levels are determined in another manner from the color histograms.

Step 107 comprises comparing each of the second dynamicity levels with the first dynamicity level. Like in FIG. 9, step 109 comprises a sub step 135, which comprises selecting a subset of the analysis areas by selecting the one or more of the second dynamicity levels that are similar to or the same as the first dynamicity level. Next, steps 111-115 of FIG. 3 are performed.

In the embodiments of FIGS. 9 to 11, different methods are used to determine the levels of dynamicity. In an alternative embodiment, multiple of these methods are combined in the same embodiment. Each level of dynamicity determined with a different method may then be compared and this makes it possible to distinguish between overall dynamics and color dynamics, for example. This results in a better performance.

Figure 12:
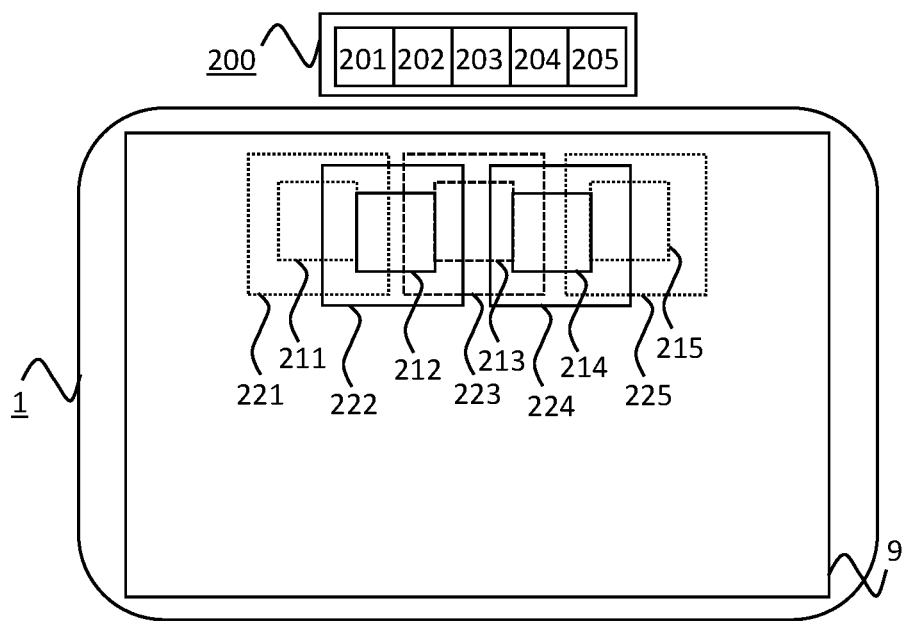
FIG. 12 shows an example in which analysis areas for a LED strip are selected.

FIG. 12 shows an example in which analysis areas for a pixelated LED strip 200 are selected. Since each LED of a pixelated LED strip is normally mapped to a relatively small analysis area, even slightly moving the analysis area might lead to an undesired light effect, i.e. a light effect that does not seem to match the content. This may be mitigated or prevented by increasing the analysis areas without changing the center of the areas, but for pixelated LED strips, a different solution is also available.

In this example, the LED strip 200 has five LEDs 201-205. LEDs 201-205 are associated with default analysis areas 211-215, respectively. For each LED, a dynamicity level of the default analysis area and a dynamicity level of a corresponding alternative analysis area are determined. The alternative analysis areas 221-225 are larger than, but have the same center as, the respective corresponding default analysis areas 211-215.

If the dynamicity level of, for example, the alternative analysis area 223 is more similar to the overall dynamicity level than the dynamicity level of the default analysis area 213 and the alternative analysis area is sufficiently similar to the overall dynamicity level, then the alternative analysis area 213 is selected. If the dynamicity levels of neither the default analysis area 213 nor the alternative analysis area 223 are sufficiently similar to the overall dynamicity level, then one of the following solutions may be used:

A. Mixing the light effects determined for LED 203 from the neighboring analysis areas, i.e. analysis areas 212 and 214, creates a homogenous light effect and may prevent a mismatch between the dynamicity of LED 203 and the overall dynamicity. Thus, the neighboring areas 212 and 214 may form the subset of analysis areas selected for LED 203. The light effects determined from the neighboring analysis areas may even be mixed with the light effect determined from one of the analysis areas associated with the LED 203, e.g. default analysis areas 213 or alternative analysis areas 223. For example, some parameters of the light effects determined from analysis areas 212 and 214 may be mixed, e.g. parameters representing dynamicity, while one or more other parameters are taken from the analysis area 213 or 223, e.g. a parameter representing the color palette.

B. Instead of mixing light effects, the same results may be obtained by determining a light effect directly from the combined analysis areas 212 and 214 instead of first determining light effects from the analysis areas 212 and 214 separately and then mixing them. The advantage of solution B over solution A is that it maintains the overall architecture, i.e. an area(s) on the screen is mapped to a light source (LED). The advantage of solution A over solution B is that it is computationally less demanding.

C. Instead of changing the size of the analysis areas or shifting the analysis area, the weight of contribution that each pixel in the analysis area has on the generated light effect may be varied. In this way, analysis area 213 or 223 can still be selected for LED 203, but the impact of static or overly dynamic pixels compared to other pixels within the same analysis area may be reduced.

FIG. 13 depicts a block diagram illustrating an exemplary data processing system that may perform the method as described with reference to FIGS. 2 and 9 to 11.

As shown in FIG. 13, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that can perform the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 13 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 13, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 13) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for determining image characteristics from an analysis area in video content, said image characteristics being used to determine one or more light effects to be rendered on one or more lighting devices while said video content is rendered on a display device, said system comprising:
   at least one output interface; and
   at least one processor configured to:
      obtain successive video frames,
      determine a first level of dynamicity in said video frames, wherein the first level of dynamicity in said video frames represents how much video frames change in successive ones of the video frames,
      determine a second level of dynamicity in each of a plurality of analysis areas in said video frames, wherein the second level of dynamicity in said plurality of analysis areas in said video frames represents how much the respective analysis area change in successive ones of the video frames,
      compare each of said second dynamicity levels with said first dynamicity level,
      select a subset of said analysis areas based on said comparisons,
      determine image characteristics from said subset of analysis areas in said video content,
      determine one or more light effects based on said image characteristics, and
      use said at least one output interface to control said one or more lighting device to render said one or more light effects and/or store a light script specifying said one or more light effects.

2. A system as claimed in claim 1, wherein said first dynamicity level represents an overall dynamicity of said video frames.

3. A system as claimed in claim 2, wherein said at least one processor is configured to select said subset of said analysis areas by selecting one or more second dynamicity levels which are similar to or the same as said first dynamicity level from said determined second dynamicity levels.

4. A system as claimed in claim 1, wherein said first dynamicity level is determined per pixel or per region of pixels.

5. A system as claimed in claim 1, wherein at least one of said subset of analysis areas has a different size and/or position than a default analysis area while staying within boundaries specified for said default analysis area.

6. A system as claimed in claim 1, wherein said video frames are part of said video content.

7. A system as claimed in claim 1, wherein said video frames and said video content belong to a same game, a same type of game or a same collection of games.

8. A system as claimed in claim 1, wherein said at least one processor is configured to determine said first dynamicity level and/or said second dynamicity levels by comparing successive ones of said video frames.

9. A system as claimed in claim 8, wherein said at least one processor is configured to determine chromaticity and/or brightness differences in said successive ones of said video frames.

10. A system as claimed in claim 8, wherein said at least one processor is configured to detect edges in each of said successive ones of said video frames and determine changes in said detected edges between said successive ones of said video frames.

11. A system as claimed in claim 1, wherein said at least one processor is configured to determine said first dynamicity level and/or said second dynamicity levels by determining a color histogram over said video frames.

12. A system as claimed in claim 11, wherein said at least one processor is configured to determine how many colors have appeared more than a predetermined number of times in said color histogram.

13. A method of determining image characteristics from an analysis area in video content, said image characteristics being used to determine one or more light effects to be rendered on one or more lighting devices while said video content is rendered on a display device, said method comprising:
   obtaining successive video frames;
   determining a first level of dynamicity in said video frames, wherein the first level of dynamicity in said video frames represents how much video frames change in successive ones of the video frames;
   determining a second level of dynamicity in each of a plurality of analysis areas in said video frames, wherein the second level of dynamicity in said plurality of analysis areas in said video frames represents how much the respective analysis area change in successive ones of the video frames;
   comparing each of said second dynamicity levels with said first dynamicity level;
   selecting a subset of said analysis areas based on said comparisons;
   determining image characteristics from said subset of analysis areas in said video content;
   determining one or more light effects based on said image characteristics; and
   controlling said one or more lighting device to render said one or more light effects and/or store a light script specifying said one or more light effects.

14. A computer program or suite of computer programs comprising at least one software code portion embodied on a non-transitory computer readable storage medium, the software code portion, when run on a computer system, being configured for enabling the method of claim 13 to be performed.

* * * * *